United States Patent
Kang et al.

(10) Patent No.: US 10,728,670 B1
(45) Date of Patent: Jul. 28, 2020

(54) VEHICLE AND METHOD FOR CONTROLLING THEREOF

(71) Applicants: Hyundai Motor Company, Seoul (KR); Kia Motors Corporation, Seoul (KR)

(72) Inventors: HyeonHee Kang, Uijeongbu-si (KR); Minsik Yang, Seoul (KR); Yonghwan Hwang, Hwaseong-si (KR); Jaehyuk Jang, Seoul (KR); Young Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/596,279

(22) Filed: Oct. 8, 2019

(30) Foreign Application Priority Data

Apr. 2, 2019 (KR) .......................... 10-2019-0038361

(51) Int. Cl.
| | |
|---|---|
| *H04R 7/04* | (2006.01) |
| *H04R 1/02* | (2006.01) |
| *H04R 9/06* | (2006.01) |
| *H04R 3/04* | (2006.01) |
| *H04R 9/04* | (2006.01) |
| *B60R 11/00* | (2006.01) |
| *B60J 1/00* | (2006.01) |
| *B60R 11/02* | (2006.01) |

(52) U.S. Cl.
CPC ............. *H04R 7/045* (2013.01); *H04R 1/025* (2013.01); *H04R 3/04* (2013.01); *H04R 9/047* (2013.01); *H04R 9/06* (2013.01); *B60J 1/001* (2013.01); *B60R 11/0217* (2013.01); *B60R 2011/0026* (2013.01); *H04R 2499/13* (2013.01)

(58) Field of Classification Search
CPC .................. B60J 1/001; B60R 11/0217; B60R 2011/0026
See application file for complete search history.

(56) References Cited

U.S. PATENT DOCUMENTS

| | | | |
|---|---|---|---|
| 2007/0217616 A1* | 9/2007 | Miyazaki | ................ H04R 5/04 381/15 |
| 2019/0092437 A1* | 3/2019 | Coletti | ................... B63B 45/08 |

* cited by examiner

*Primary Examiner* — Andrew L Sniezek
(74) *Attorney, Agent, or Firm* — Slater Matsil, LLP

(57) ABSTRACT

A vehicle includes a power source, a first glass, a second glass provided on one side of the first glass, a first coil provided on the first glass, and a second coil provided on the second glass. A controller configured to determine a direction in which sound is to be output, to control the power source so that an AC current is applied to the first coil and a DC current is applied to the second coil when it is determined that the sound is to output to an inside direction of the vehicle, and to control the power source so that an AC current is applied to the second coil and a DC current is applied to the first coil when it is determined that the sound is to be output to an outside direction of the vehicle.

19 Claims, 7 Drawing Sheets

VEHICLE AND METHOD FOR CONTROLLING THEREOF

CROSS-REFERENCE TO RELATED APPLICATIONS

This application claims priority to Korean Patent Application No. 10-2019-0038361, filed in the Korean Intellectual Property Office on Apr. 2, 2019, which application is hereby incorporated herein by reference.

TECHNICAL FIELD

Embodiments of the present disclosure relate to a vehicle and a method for controlling thereof.

BACKGROUND

A vehicle represents a variety of apparatuses configured to transport an object, such as people and goods, to a destination. The vehicle may be capable of moving to a variety of locations by using one or more wheels installed in a body of the vehicle. The vehicle may include a two-wheeled vehicle, a three-wheeled vehicle, and a four-wheeled vehicle, such as a motorcycle, construction equipment, a bicycle or a train traveling on rails disposed on a line.

In addition, the necessity of a technology for transmitting a warning sound to notify a pedestrian around the vehicle due to the proliferation of electric vehicles and autonomous vehicles is increasing.

Recently, research has been conducted on a technology for implementing a speaker function by applying a heating wire provided in the vehicle.

SUMMARY

Embodiments of the present disclosure relate to a vehicle and a method for controlling thereof. Particular embodiments relate to a technology for outputting sound to an inside and an outside of a vehicle using a heating coil provided in a rear glass of the vehicle.

Embodiments of the present disclosure provide a vehicle and a method for controlling thereof to output sound to an inside and an outside of the vehicle by implementing the function of a speaker using a heating coil provided in a rear glass of the vehicle Additional aspects of the present disclosure will be set forth in part in the description which follows and, in part, will be obvious from the description, or may be learned by practice of the present disclosure.

In accordance with one aspect of the present disclosure, a vehicle includes a power source for applying an alternating current (AC) or a direct current (DC), a first glass, a second glass provided on one side of the first glass, a first coil provided on the first glass, a second coil provided on the second glass and a controller configured to determine a direction in which sound is to be output to an outside direction or an inside direction of the vehicle. The controller is configured to control the power source so that the AC current is applied to the first coil and the DC current is applied to the second coil when it is determined that the sound is output to the inside direction of the vehicle, and is configured to control the power source so that the AC current is applied to the second coil and the DC current is applied to the first coil when it is determined that the sound is output to the outside direction of the vehicle.

When the AC current is applied to the first coil and the DC current is applied to the second coil, the first coil may vibrate and may output sound based on a magnetic field formed in the first coil and a magnetic field formed in the second coil.

The first coil is provided inside the first glass, and wherein the first glass may amplify the sound output from the first coil by amplifying the vibration of the first coil.

When the AC current is applied to the second coil and the DC current is applied to the first coil, the second coil may vibrate and may output sound based on a magnetic field formed in the first coil and a magnetic field formed in the second coil.

The second coil is provided inside the second glass, and wherein the second glass may amplify the sound output from the second coil by amplifying the vibration of the second coil.

The first glass is provided toward the inside of the vehicle from the rear glass of the vehicle, and wherein the second glass is provided toward the outside of the vehicle from the rear glass of the vehicle.

The first coil may output sound to the inside of the vehicle based on the alternating current applied to the first coil, and wherein the controller may control a frequency of an acoustic signal output by the first coil by controlling a frequency of the alternating current applied to the first coil.

The second coil may output sound to the outside of the vehicle based on the alternating current applied to the second coil, and wherein the controller may control a frequency of an acoustic signal output by the second coil by controlling a frequency of the alternating current applied to the second coil.

The controller may control a magnitude of an acoustic signal output by the first coil by controlling a magnitude of the AC current applied to the first coil and a magnitude of the DC current applied to the second coil.

The controller may control a magnitude of an acoustic signal output by the second coil by controlling a magnitude of the AC current applied to the second coil and a magnitude of the DC current applied to the first coil.

The first coil and the second coil are provided in the first glass and the second glass in a predetermined pattern.

In accordance with another aspect of the present disclosure, a method can be used for controlling a vehicle that includes a power source, a first coil provided in a first glass and a second coil provided in a second glass. The method includes determining a direction in which sound is to be output to an outside direction or an inside direction of the vehicle, controlling the power source so that an AC current is applied to the first coil and a DC current is applied to the second coil when it is determined that the sound is output to the inside direction of the vehicle, and controlling the power source so that the AC current is applied to the second coil and the DC current is applied to the first coil when it is determined that the sound is output to the outside direction of the vehicle.

The first coil outputting sound to the inside of the vehicle when the alternating current is applied to the first coil and the direct current is applied to the second coil, and wherein the controlling of the power source may include: controlling a frequency of the alternating current applied to the first coil to control a frequency of an acoustic signal output by the first coil to the inside of the vehicle.

The method may include controlling a magnitude of an acoustic signal output by the first coil by controlling a magnitude of the AC current applied to the first coil and a magnitude of the DC current applied to the second coil.

The second coil outputting sound to the outside of the vehicle when the alternating current is applied to the second coil and the direct current is applied to the first coil, and wherein the controlling of the power source may include: controlling a frequency of the alternating current applied to the second coil to control a frequency of an acoustic signal output by the second coil to the outside of the vehicle.

The method may include controlling a magnitude of an acoustic signal output by the second coil by controlling a magnitude of the AC current applied to the second coil and a magnitude of the DC current applied to the first coil.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION OF ILLUSTRATIVE EMBODIMENTS

In the following description, like reference numerals refer to like elements throughout the specification. Well-known functions or constructions are not described in detail since they would obscure one or more of the exemplar embodiments with unnecessary detail. Terms such as "unit," "module," "member," and "block" may be embodied as hardware or software. According to embodiments, a plurality of "units," "modules," "members," and "blocks" may be implemented as a single component or a single "unit," "module," "member," and "block" may include a plurality of components.

It will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

It will be understood that, although the terms first, second, third, etc., may be used herein to describe various elements, they should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

Reference will now be made in detail to embodiments of the present disclosure, examples of which are illustrated in the accompanying drawings.

Figure 1:
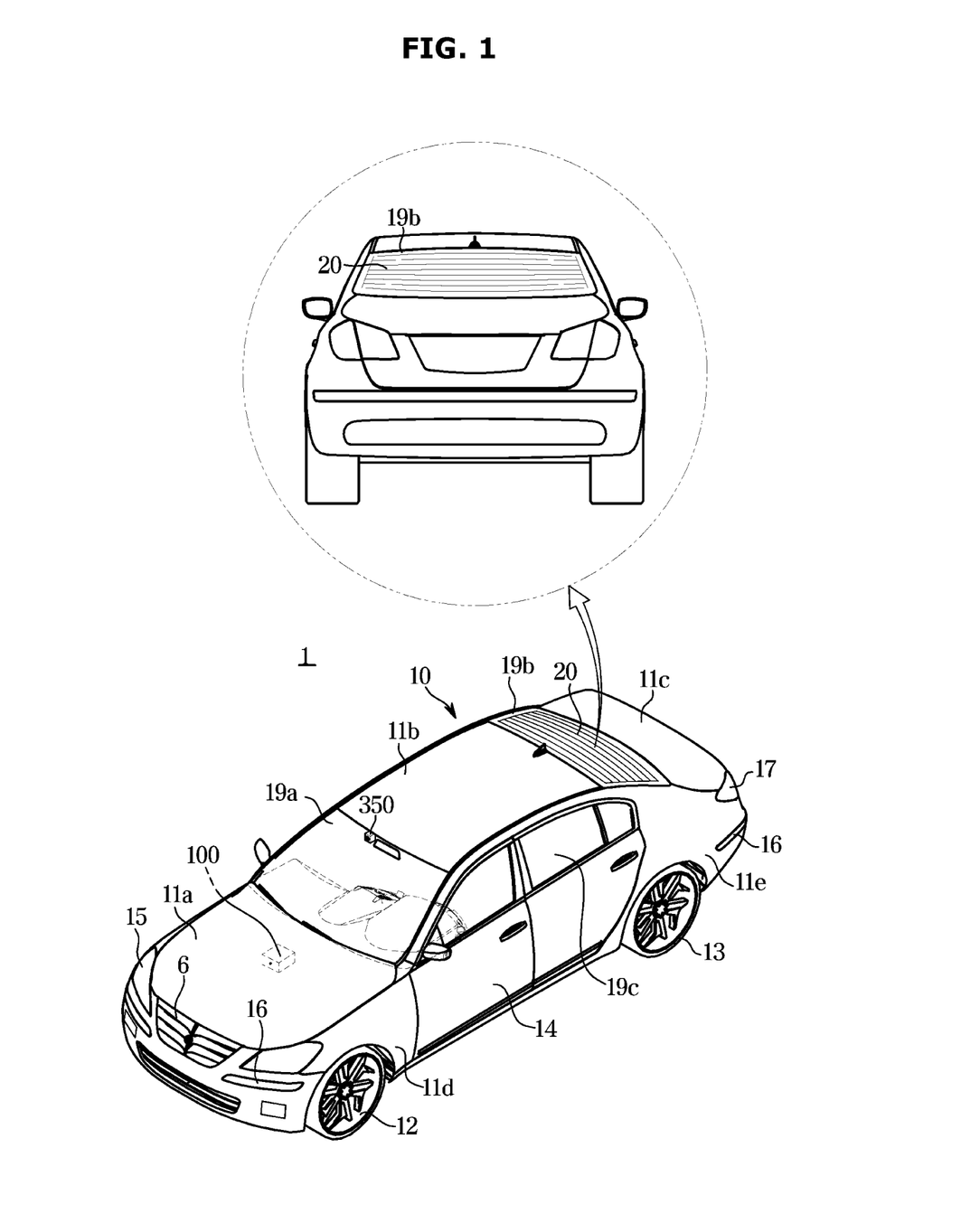
FIG. 1 is a perspective view schematically illustrating an appearance of a vehicle according to an embodiment of the present disclosure.

FIG. 1 is a perspective view schematically illustrating an appearance of a vehicle according to an embodiment of the present disclosure.

Hereinafter for convenience of description, as illustrated in FIG. 1, a direction in which a vehicle moves forward may be defined as a front side, and a left direction and a right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as a rear side. A bottom direction with respect to a vehicle 1 may be defined as a lower side and a direction opposite to the lower side may be defined as an upper side. A surface disposed in the front side may be defined as a front surface, a surface disposed in the rear side may be defined as a rear surface, and a surface disposed in a lateral side may be defined as a side surface. The side surface in the left direction may be defined as a left side surface and the side surface in the right direction may be defined as a right side surface.

Referring to FIG. 1, the vehicle 1 may include a body 10 forming an exterior of the vehicle 1, and vehicle wheels 12 and 13 moving the vehicle 1.

The body 10 may include a hood 11a protecting a variety of devices, which are needed to drive the vehicle 1, e.g., an engine, a roof panel 11b forming an inner space, a trunk lid 11c provided with a storage space, a front fender 11d and a quarter panel 11e provided on the side surface of the vehicle 1. In addition, a plurality of doors 14 hinge-coupled to the body 10 may be provided on the side surface of the body 10.

Between the hood 11a and the roof panel 11b, a front window 19a may be provided to provide a view of the front side of the vehicle 1, and between the roof panel 11b and the trunk lid 11c, a rear glass 19b may be provided to provide a view of the rear side of the vehicle 1. In addition, on the upper side of the door 14, a side glass 19c may be provided to provide a view of the lateral side.

In general, a heating wire 20 is provided on the rear glass 19b. The heating wire 20 may be implemented in a predetermined pattern, and the heating wire pattern generates heat by using a current, thereby transferring heat to the rear glass 19b. Accordingly, frost in a liquid state on the rear glass 19b may be vaporized due to heat, and fogging may be prevented.

If fogging is prevented, a driver can easily obtain visual information behind the vehicle 1.

According to the vehicle and a control method thereof according to an embodiment of the disclosed invention, by changing the structure of the heating wire 20 provided in the rear glass 19b can be operated as a speaker for outputting sound in addition to the anti-fog function. This will be described in detail later with reference to FIG. 2.

On the front side of the vehicle 1, a headlamp 15 emitting light in a driving direction of the vehicle 1 may be provided.

On the front and the rear side of the vehicle 1, a turn signal lamp 16 indicating the driving direction of the vehicle 1 may be provided.

The vehicle 1 may display the driving direction by flashing the turn signal lamp 16. On the rear side of the vehicle 1, a tail lamp 17 may be provided. The tail lamp 17 may be provided on the rear side of the vehicle 1 to display a gear shifting state and a brake operating state of the vehicle 1.

In the vehicle 1, at least one image capturer 350 may be provided. The image capturer 350 may capture images around the vehicle 1 when the vehicle 1 drives or stops, detect an object around the vehicle 1, and further acquire the type of the object and position information of the object. The object captured around the vehicle 1 may include another vehicle, a pedestrian, or a bicycle, and further include a moving object or a variety of stationary obstacles.

The image capturer 350 may capture an object around the vehicle 1 and detect the type of the object by identifying the shape of the captured object via image recognition, and transmit the detected information to a controller 100.

Also, in the vehicle 1, a sensor configured to detect an object in front of the vehicle and acquire at least one of position information or driving speed information of the detected object.

The sensor according to the embodiment may acquire coordinate information of an object around the vehicle 1 with respect to the vehicle 1. That is, the sensor may acquire the coordinate information, which is changed according to the movement of the object, in real time, and may detect a distance between the vehicle 1 and the object.

The sensor may be implemented by using a variety of devices, e.g., a radar using millimeter waves or microwaves, Light Detection And Ranging (LiDAR) using pulsed laser light, a vision sensor using visible light, an infrared sensor using infrared light, or an ultrasonic sensor using ultrasonic waves. The sensor may be implemented by using any one of the radar, the Light Detection And Ranging (LiDAR), the vision sensor, the infrared sensor, or the ultrasonic sensor, or a combination of them.

Figure 2:
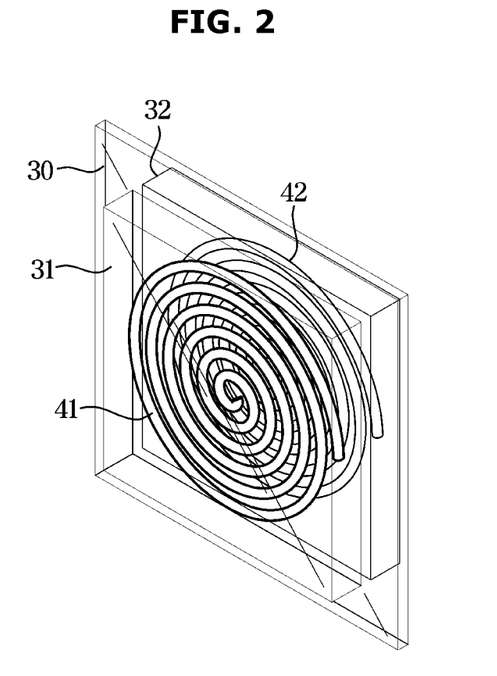
FIG. 2 is an exploded perspective view illustrating a coil provided in a rear glass and an inside of a vehicle to be implemented as a speaker according to an embodiment.
Figure 3:
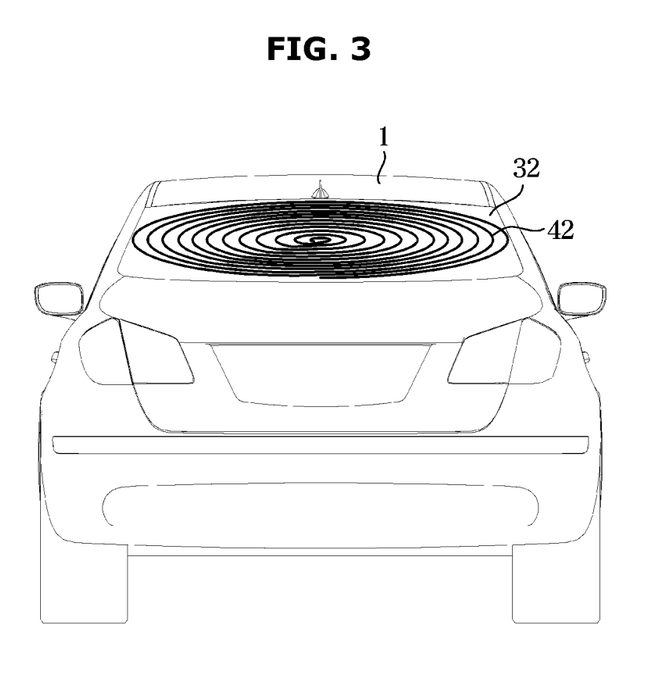
FIG. 3 is a view of the coil provided in the rear glass of the vehicle, according to an embodiment, as seen from the rear of the vehicle.

FIG. 2 is an exploded perspective view illustrating a coil provided in a rear glass and an inside of a vehicle to be implemented as a speaker according to an embodiment, and FIG. 3 is a view of the coil provided in the rear glass of the vehicle, according to an embodiment, as seen from the rear of the vehicle.

Referring to FIG. 2, the rear glass 19b of the vehicle 1 may include a first glass 31 and a second glass 32. The first glass 31 may be provided toward the inside of the vehicle 1, and the second glass 32 may be provided toward the outside of the vehicle 1.

That is, the first glass 31 and the second glass 32 may be stacked with a windshield inner film 30 interposed therebetween to form the rear glass 19b of the vehicle 1. At this time, the film 30 provided between the first glass 31 and the second glass 32 is not limited as long as it is a film through which a magnetic field can pass.

Although the conventional rear glass 19b is implemented with one glass layer, the rear glass 19b according to an embodiment of the disclosed invention may be implemented with two layers of the first glass 31 and the second glass 32.

The thickness of the first glass 31 and the second glass 32 may vary depending on the rear glass 19b design.

As shown in FIG. 2, a first coil 41 may be provided inside the first glass 31, and a second coil 42 may be provided inside the second glass 32.

The first coil 41 and the second coil 42 may be implemented in a predetermined pattern, and there is no limitation in the form of such pattern. However, it will be described on the premise that the first coil 41 and the second coil 42 according to the disclosed embodiment are implemented in a circular pattern.

The first coil 41 and the second coil 42 may be implemented in the circular pattern at predetermined equal intervals, and may be positioned to face each other.

The first coil 41 and the second coil 42 correspond to a coil functioning as the heating wire 20 provided in the rear glass 19b of the vehicle 1, and furthermore, the first coil 41 and the second coil 42 have conductivity, so current can flow according to the application of power.

Referring to FIG. 3, the first coil 41 and the second coil 42 may be embedded in the rear glass 19b of the rear surface of the vehicle 1 as described above. That is, the first coil 41 may be embedded in the first glass 31 to be disposed toward the inside of the vehicle 1. The second coil 42 may be embedded in the second glass 32 by stacking the second glass 32 with the film 30 interposed therebetween and may be disposed toward the outside of the vehicle 1.

The heating wire 20 provided in the rear glass 19b of the conventional vehicle 1 is generally arranged in the form of horizontal rows having equal intervals, however, the first coil 41 and the second coil 42 according to the disclosed embodiment may be arranged in various forms according to a predetermined pattern, and in particular, the first coil 41 and the second coil 42 may be arranged in the circular pattern to be implemented as the speaker.

Figure 4:
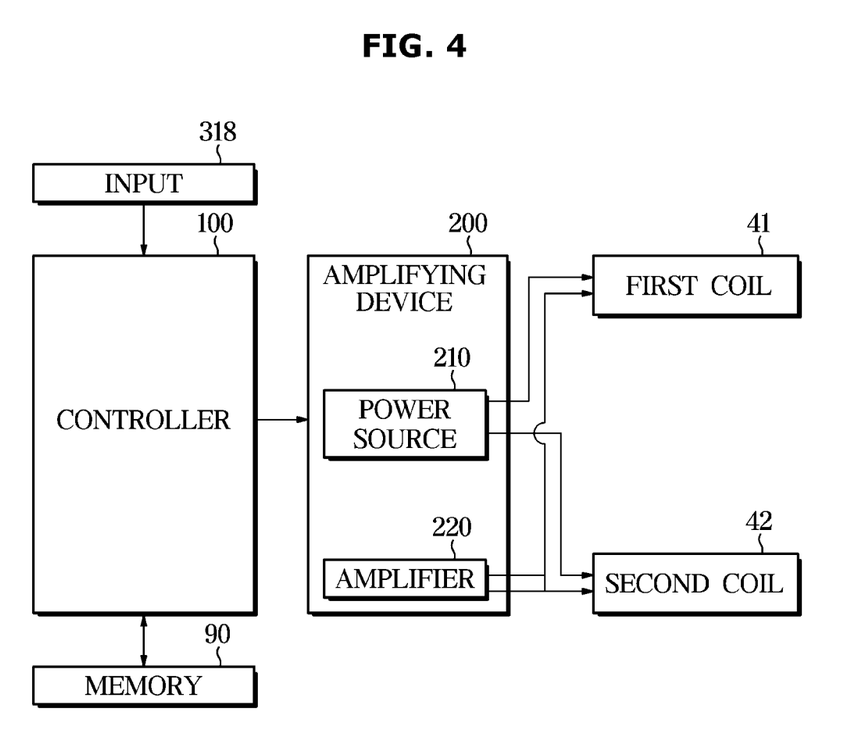
FIG. 4 is a control flow diagram illustrating a vehicle according to the embodiment.
Figure 5:
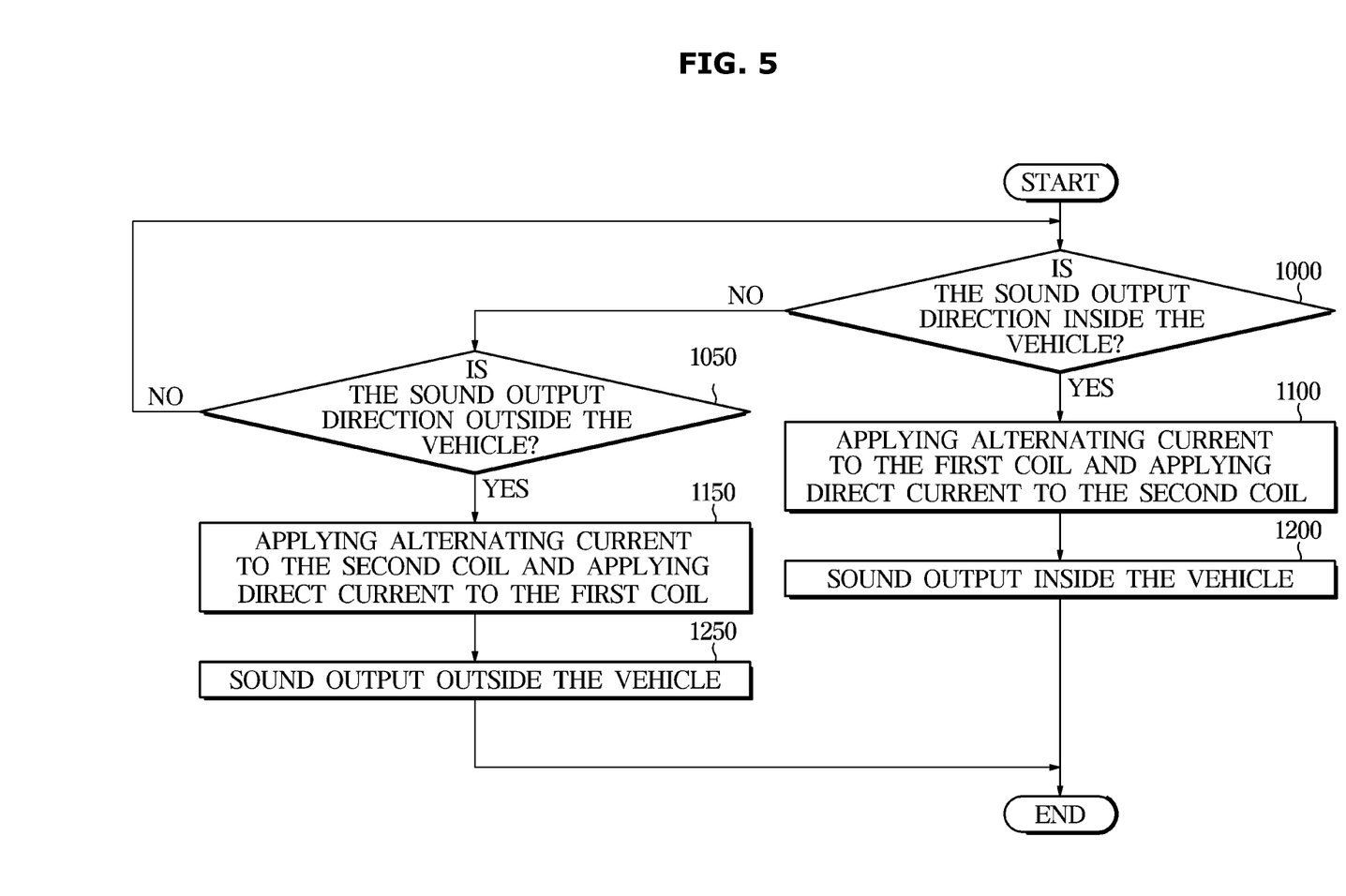
FIG. 5 is a flowchart of a method for controlling the vehicle according to the embodiment of the present disclosure.
Figure 6:
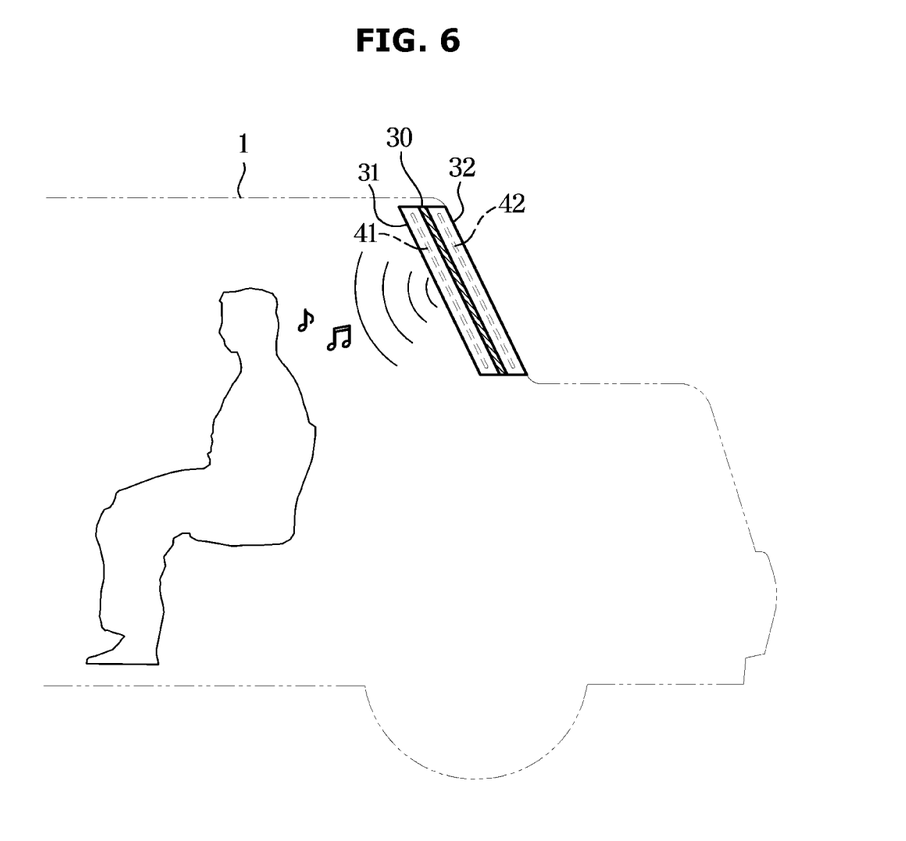
FIG. 6 illustrates that sound is output from a rear glass to an inside of a vehicle according to one embodiment.
Figure 7:
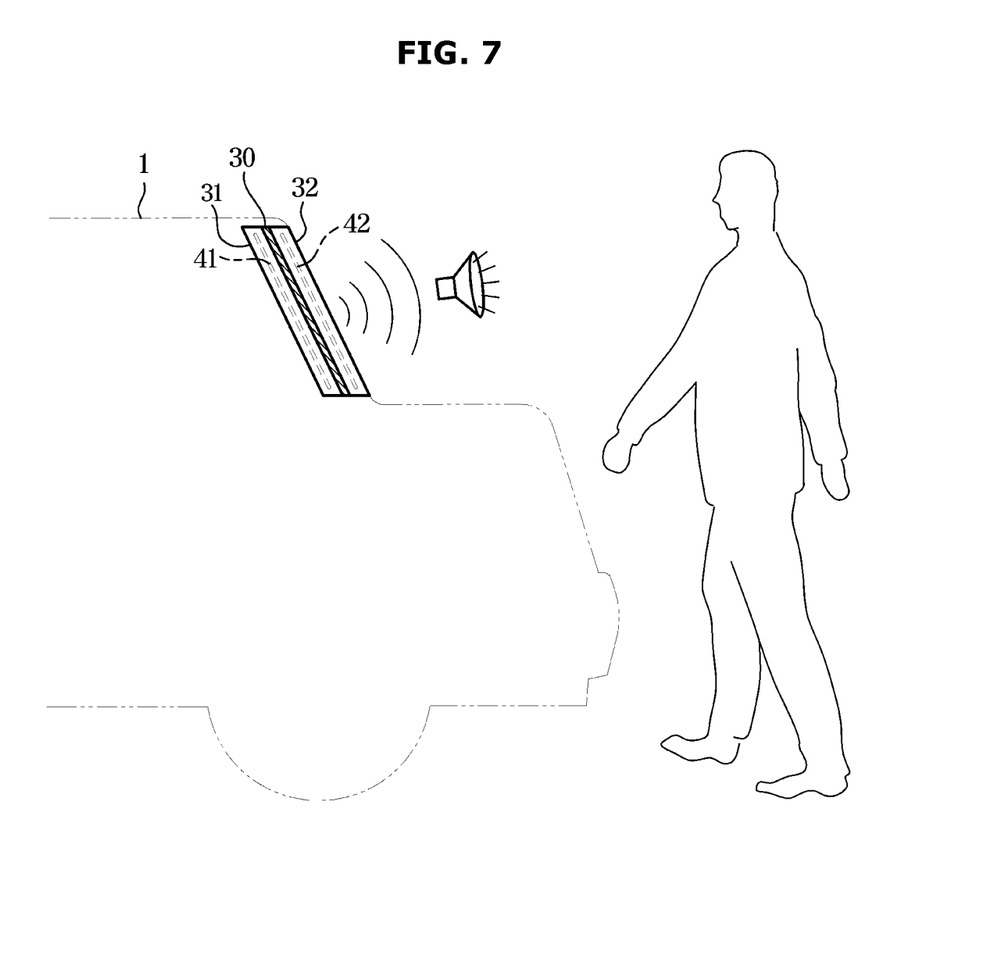
FIG. 7 illustrates that sound is output from the rear glass to an outside of the vehicle according to one embodiment.

FIG. 4 is a control flow diagram illustrating a vehicle according to the embodiment, and FIG. 5 is a flowchart of a method for controlling the vehicle according to the embodiment of the present disclosure. FIG. 6 illustrates that sound is output from a rear glass to an inside of a vehicle according to one embodiment, and FIG. 7 illustrates that sound is output from the rear glass to an outside of the vehicle according to one embodiment.

Referring to FIG. 4, the vehicle 1 according to an embodiment includes the first coil 41 provided inside the first glass 31, the second coil 42 provided inside the second glass 32, and a memory 90, the controller 100, an amplifying device 200, and an input 318.

The input 318 may be provided in a center fascia of the vehicle 1 to receive various commands related to the control of the vehicle 1. The input 318 may be implemented using a physical button, a knob, a touch pad, a touch screen, a stick-type operator or a track ball. The driver can control various operations of the vehicle 1 by operating the input 318.

The driver and a passenger of the vehicle 1 may input an output for outputting multimedia content of the vehicle 1 through the input 318, or may transmit an alert sound to the outside of the vehicle 1.

That is, music may be played through the input 318 or radio may be played, and a control command may be input such that an image is displayed on a display unit of an AVN device. In addition, the driver may input the control command for transmitting a warning sound for notifying the approach of the vehicle 1 to a pedestrian outside the vehicle 1 while the vehicle 1 is driving.

As will be described later, the controller 100 may determine whether sound is output from the rear glass 19b of the vehicle 1 to the inside or the outside of the vehicle 1 according to the control command received through the input 318.

The memory 90 may store various data related to the control of the vehicle 1. That is, the memory 90 may store the vehicle 1 control command input by a user, and may store data related to the vehicle and the method of controlling the vehicle according to the disclosed embodiment.

The memory 90 may be implemented by using at least one of a non-volatile memory element, e.g., a cache, Read Only Memory (ROM), Programmable ROM (PROM), Erasable Programmable ROM (EPROM), Electrically Erasable Programmable ROM (EEPROM) and a flash memory; a volatile memory element, e.g., Random Access Memory (RAM); or a storage medium, e.g., Hard Disk Drive (HDD) and CD-ROM. The implementation of the memory 90 is not limited thereto. The memory 90 may be a memory that is implemented by a separate memory chip from the aforementioned processor related to the controller 100 or the memory 90 may be implemented by a processor and a single chip.

The amplifying device 200 may include a power source 210 and an amplifier 220. When a head unit of the vehicle 1 reproduces data of an acoustic signal source and transmits the data to the amplifying device 200, the amplifying device 200 amplifies the received acoustic signal and transmits an amplified signal to the first coil 41 or the second coil 42.

The power source 210 of the amplifying device 200 may apply DC power or AC power to the first coil 41 and the second coil 42, and the amplifier 220 may amplify the acoustic signal transmitted to the first coil 41 or the second coil 42.

The controller 100 may perform electronic control on each component related to the operation of the vehicle 1.

Hereinafter, the vehicle and the control method thereof according to an embodiment of the disclosed invention will be described based on the flowchart shown in FIG. 5.

The principle of a general speaker includes a voice coil and a magnet for outputting sound, and when a current flows through the voice coil, a magnetic field is formed in the voice coil. Since the magnetic field is also formed in the magnet, the voice coil and the magnet are pushed together by the magnetic field formed in the voice coil and the magnet, and the voice coil and the magnet are pulled together when a change in the magnetic field occurs.

As such, when the voice coil and the magnet are repeatedly pushed and pulled by the magnetic field formed in the surroundings and vibrated, a vibrating plate mounted on the voice coil vibrates and outputs sound.

According to the vehicle and the control method thereof according to an embodiment of the present disclosure, a direct current or an alternating current is applied to the first coil 41 provided in the first glass 31 and the second coil 42 provided in the second glass 32, by allowing one of the first coil 41 and the second coil 42 to act as a voice coil and the other to act as a magnet, a function of outputting sound by a general speaker is implemented in the rear glass 19b.

That is, the coil to which the DC current is applied among the first coil 41 and the second coil 42 may serve as a permanent magnet, and the coil to which the alternating current is applied may serve as the voice coil.

Referring to FIG. 5, the controller 100 may apply current to the first coil 41 and the second coil 42 to determine a direction in which to output sound in order to output sound to the inside or the outside of the vehicle 1.

That is, when the user inputs the control command to play music, radio playback or video to the AVN device of the vehicle 1, the controller 100 determines that sound is output from the rear glass 19b to the inside of the vehicle 1.

If the user inputs the control command to send the warning sound to the pedestrian outside the vehicle 1 notifying that the vehicle 1 is approaching, the controller 100 may determine that sound is output from the rear glass 19b to the outside of the vehicle 1.

In addition, when an obstacle such as the pedestrian is located behind the vehicle 1 while the vehicle 1 is running, the controller 100 may determine that sound should be output from the rear glass 19b to the outside rear of the vehicle 1.

As shown in FIG. 5, when the controller 100 determines that the sound output direction of the rear glass 19b of the vehicle 1 is inside the vehicle 1 (*moo*), the controller 100 may control the power source 210 to apply an alternating current to the first coil 41 and to apply a direct current to the second coil 42 (1100).

When the alternating current is applied to the first coil 41, a magnetic field is generated in the first coil 41 according to the electromagnetic induction phenomenon. In addition, when the direct current is applied to the second coil 42, a magnetic field is generated in the second coil 42 and the second coil 42 serves as a permanent magnet. According to the alternating current applied to the first coil 41, the direction of the current applied to the first coil 41 is changed at a predetermined time interval, so that the direction of the magnetic field generated in the first coil 41 is also changed at the predetermined time interval.

The second coil 42 serves as the permanent magnet, and if the first coil 41 vibrates by the magnetic field formed by the alternating current applied to the first coil 41, the first coil 41 may output sound based on the sound signal transmitted to the first coil 41 through the amplifying device 200.

That is, when the alternating current is applied to the first coil 41 and the direct current is applied to the second coil 42, the first coil 41 serves as the voice coil and the second coil 42 serves as the permanent magnet when it corresponds to the above-described general speaker configuration and sound output principle.

Therefore, the first coil 41 and the second coil 42 are pushed together by the magnetic field formed in the first coil 41 and the magnetic field of the second coil 42, and when the magnetic field changes, the first coil 41 and the second coil 42 are drawn to each other.

As described above, when the first coil 41 to which the alternating current is applied and the second coil 42 to which the direct current is applied are vibrated by repeatedly pushing and pulling each other, the vibration of the first coil 41 increases the vibration of the first glass 31 so that the sound output from the first coil 41 is amplified.

That is, since the first coil 41 is provided inside the first glass 31, the first glass 31 vibrates according to the vibration of the first coil 41, accordingly, the first coil 41 provided inside the vehicle 1 may output sound to the inside of the vehicle 1 (1200).

Referring to FIG. 6, when the sound is output from the first coil 41 to the inside of the vehicle 1 by the above-described method, an occupant of the vehicle 1 may feel as if the speaker is located in the rear glass 19b and the sound is output.

That is, in a general case, the occupant of the vehicle 1 may listen to the sound such as music or a call through the speaker device provided in the vehicle 1, but according to one embodiment of the disclosed invention, in addition to the speaker device provided in the vehicle 1, the occupant may hear the sound such as the music or the call through the vibration of the first coil 41 provided in the rear glass 19b.

The controller 100 may control the frequency of the acoustic signal output from the first coil 41 by controlling the frequency of the alternating current applied to the first coil 41. In addition, the controller 100 may control the magnitude of the alternating current applied to the first coil 41 and the magnitude of the direct current applied to the second coil 42 to adjust the magnitude of the acoustic signal output from the first coil 41.

Referring again to FIG. 5, when the controller 100 determines that the sound output direction of the rear glass 19b of the vehicle 1 is outside the vehicle 1 (1050), the controller 100 may control the power source 210 to apply the alternating current to the second coil 42 and to apply the direct current to the first coil 41 (1150).

When the alternating current is applied to the second coil 42, a magnetic field is generated in the second coil 42 according to the electromagnetic induction phenomenon. In addition, when the direct current is applied to the first coil 41, a magnetic field is generated in the first coil 41, and the first coil 41 serves as the permanent magnet. Since the direction of the current applied to the second coil 42 is changed at regular time intervals according to the alternating current applied to the second coil 42, the direction of the magnetic field generated at the second coil 42 is also changed at the regular time intervals.

The first coil 41 serves as the permanent magnet, and when the second coil 42 vibrates by the magnetic field formed by the alternating current applied to the second coil 42, the second coil 42 may output sound based on the sound signal transmitted to the second coil 42 through the amplifying device 200.

That is, when the alternating current is applied to the second coil 42 and the direct current is applied to the first coil 41, in response to the above-described general speaker configuration and sound output principle, the second coil 42 serves as the voice coil, and the first coil 41 serves as the permanent magnet.

Therefore, the second coil 42 and the first coil 41 are pushed together by the magnetic field formed in the second coil 42 and the magnetic field of the first coil 41, and when the magnetic field changes, the second coil 42 and the first coil 41 are pulled together.

As such, when the second coil 42 to which the alternating current is applied and the first coil 41 to which the direct current is applied are vibrated by repeatedly pushing and pulling each other, the vibration of the second coil 42 adds to the vibration of the second glass 32 so that the sound output from the second coil 42 is amplified.

That is, since the second coil 42 is provided inside the second glass 32, in response to the vibration of the second coil 42, the second glass 32 vibrates, and accordingly, the second coil 42 provided to the outside of the vehicle 1 may output sound to the outside of the vehicle 1 (1250).

Referring to FIG. 7, when the sound is output from the second coil 42 to the outside of the vehicle 1 by the above-described method, it is possible to output the warning sound to the pedestrian located behind the vehicle 1.

That is, in general, in order to send the warning sound to the outside of the vehicle 1, a separate speaker device should be provided in the vehicle 1, but according to one embodiment of the disclosed invention, in addition to the separate speaker device provided in the vehicle 1, the warning sound can be output to the outside rear of the vehicle 1 through the vibration of the second coil 42 provided in the rear glass 19b, thus the pedestrians around the vehicle 1 can be alerted to the danger of the approach or collision of the vehicle 1.

Also, by outputting sound from the second coil 42 to the outside rear of the vehicle 1, it is possible to achieve the sound output purpose such as music reproduction to the outside of the vehicle 1.

The controller 100 may control the frequency of the acoustic signal output from the second coil 42 by controlling the frequency of the alternating current applied to the second coil 42. In addition, the controller 100 may control the magnitude of the alternating current applied to the second coil 42 and the magnitude of the direct current applied to the first coil 41 to adjust the magnitude of the acoustic signal output from the second coil 42.

In addition, by applying current to the first coil 41 and the second coil 42, moisture of the rear glass 19b can be removed through heat generation, such as by the heating wire provided in the rear glass 19b of the conventional vehicle 1.

Thus, according to the vehicle and the control method according to an embodiment of the disclosed invention, by using the first glass 31 and the second glass 32 constituting the rear glass 19b of the vehicle 1 and the first coil 41 provided inside the first glass 31 and the second coil 42 provided inside the second glass 32 to implemented the function of the speaker, various types of speaker systems may be implemented by outputting sound inside and outside of the vehicle 1.

In addition, the first coil 41 and the second coil 42 provided in the rear glass 19b implement the function of the speaker, thereby making it easy to secure an interior space of the vehicle 1.

In addition, there is an effect of preventing the fogging of the rear glass 19b through heat applied to the first coil 41 and the second coil 42 to operate the speaker.

The disclosed embodiments may be implemented in the form of a recording medium that stores instructions executable by a computer. The instructions may be stored in the form of a program code and may perform the operations of the embodiments disclosed by creating a program module when executed by a processor. The recording medium may be implemented in a computer-readable recording medium.

The computer readable recording medium may include various kinds of recording medium in which an instruction decrypted by the computer system is stored. For example, the computer readable recording medium may include Read Only Memory (ROM), Random Access Memory (RAM), a magnetic tape, a magnetic disk, a flash memory, and an optical data storage device.

As is apparent from the above description, according to the proposed vehicle and the method for controlling thereof, it may be possible to reduce controlled variables for detecting an object in an area, in which the object is not present, by variably setting the area, which is configured to detect the object for avoiding a collision between the vehicle and the object, according to the type of the object.

In addition, it may be possible to secure safety by avoiding collision according to the risk of collision between the vehicle and the object located in the set detection area.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a power source for applying an alternating current (AC) or a direct current (DC);
   a first glass;
   a second glass provided on one side of the first glass;
   a first coil provided on the first glass;
   a second coil provided on the second glass; and
   a controller configured to
   determine a direction in which sound is to be output;

control the power source so that the AC current is applied to the first coil and the DC current is applied to the second coil when it is determined that the sound is to output to an inside direction of the vehicle; and control the power source so that the AC current is applied to the second coil and the DC current is applied to the first coil when it is determined that the sound is to be output to an outside direction of the vehicle.

2. The vehicle of claim 1, wherein the vehicle is configured so that when the AC current is applied to the first coil and the DC current is applied to the second coil, the first coil will vibrate and output sound based on a magnetic field formed in the first coil and a magnetic field formed in the second coil.

3. The vehicle of claim 2, wherein the first coil is provided inside the first glass, and wherein the first glass amplifies the sound output from the first coil by amplifying the vibration of the first coil.

4. The vehicle of claim 1, wherein the vehicle is configured so that when the AC current is applied to the second coil and the DC current is applied to the first coil, the second coil will vibrate and output sound based on a magnetic field formed in the first coil and a magnetic field formed in the second coil.

5. The vehicle of claim 4, wherein the second coil is provided inside the second glass, and wherein the second glass amplifies the sound output from the second coil by amplifying the vibration of the second coil.

6. The vehicle of claim 1, wherein the first glass is provided toward the inside of the vehicle from a rear glass of the vehicle, and wherein the second glass is provided toward the outside of the vehicle from the rear glass of the vehicle.

7. The vehicle of claim 1,
wherein the first coil is configured to output sound to the inside of the vehicle based on the alternating current applied to the first coil; and
wherein the controller is configured to control a frequency of an acoustic signal output by the first coil by controlling a frequency of the alternating current applied to the first coil.

8. The vehicle of claim 1,
wherein the second coil is configured to output sound to the outside of the vehicle based on the alternating current applied to the second coil; and
wherein the controller is configured to control a frequency of an acoustic signal output by the second coil by controlling a frequency of the alternating current applied to the second coil.

9. The vehicle of claim 1, wherein the controller is configured to control a magnitude of an acoustic signal output by the first coil by controlling a magnitude of the AC current applied to the first coil and a magnitude of the DC current applied to the second coil.

10. The vehicle of claim 1, wherein the controller is configured to a magnitude of an acoustic signal output by the second coil by controlling a magnitude of the AC current applied to the second coil and a magnitude of the DC current applied to the first coil.

11. The vehicle of claim 1, wherein the first coil and the second coil are provided in the first glass and the second glass in the same predetermined pattern.

12. A method for controlling a vehicle that includes a power source, a first coil provided in a first glass and a second coil provided in a second glass, the method comprising:

determining a direction in which sound is to be output, the direction being an outside direction or an inside direction of the vehicle;

controlling the power source so that an AC current is applied to the first coil and a DC current is applied to the second coil when it is determined that the sound is output to the inside direction of the vehicle; and controlling the power source so that the AC current is applied to the second coil and the DC current is applied to the first coil when it is determined that the sound is output to the outside direction of the vehicle.

13. The method of claim 12,
wherein the first coil outputs sound to the inside of the vehicle when the AC current is applied to the first coil and the DC current is applied to the second coil; and
wherein controlling the power source comprises controlling a frequency of the AC current applied to the first coil to control a frequency of an acoustic signal output by the first coil to the inside of the vehicle.

14. The method of claim 12, further comprising controlling a magnitude of an acoustic signal output by the first coil by controlling a magnitude of the AC current applied to the first coil and a magnitude of the DC current applied to the second coil.

15. The method of claim 12,
wherein the second coil outputs sound to the outside of the vehicle when the AC current is applied to the second coil and the DC current is applied to the first coil; and
wherein controlling the power source comprises controlling a frequency of the AC current applied to the second coil to control a frequency of an acoustic signal output by the second coil to the outside of the vehicle.

16. The method of claim 12, further comprising controlling a magnitude of an acoustic signal output by the second coil by controlling a magnitude of the AC current applied to the second coil and a magnitude of the DC current applied to the first coil.

17. A vehicle comprising:
a power source for applying an alternating current (AC) or a direct current (DC);
a first glass provided toward an inside of the vehicle from a rear glass of the vehicle;
a second glass provided on one side of the first glass, the second glass being provided toward the outside of the vehicle from the rear glass of the vehicle;
a first coil provided on the first glass;
a second coil provided on the second glass; and
a controller configured to
determine a direction in which sound is to be output;
when it is determined that the sound is to output to an inside direction of the vehicle, control the power source so that the AC current is applied to the first coil and the DC current is applied to the second coil so that the first coil will vibrate and output sound based on a magnetic field formed in the first coil and a magnetic field formed in the second coil, and the first glass will amplify the sound output from the first coil by amplifying the vibration of the first coil; and
when it is determined that the sound is to be output to an outside direction of the vehicle, control the power source so that the AC current is applied to the second coil and the DC current is applied to the first coil so that the second coil will vibrate and output sound based on a magnetic field formed in the first coil and a magnetic field formed in the second coil and the second glass will amplify the sound output from the second coil by amplifying the vibration of the second coil.

18. The vehicle of claim 17,
wherein the first coil is configured to output sound to the inside of the vehicle based on the alternating current applied to the first coil;

wherein the controller is configured to control a frequency of an acoustic signal output by the first coil by controlling a frequency of the alternating current applied to the first coil; and wherein the second coil is configured to output sound to the outside of the vehicle based on the alternating current applied to the second coil; and wherein the controller is configured to control a frequency of an acoustic signal output by the second coil by controlling a frequency of the alternating current applied to the second coil.

19. The vehicle of claim 17, wherein the controller is configured to control a magnitude of an acoustic signal output by the first coil by controlling a magnitude of the AC current applied to the first coil and a magnitude of the DC current applied to the second coil; and wherein the controller is configured to a magnitude of an acoustic signal output by the second coil by controlling a magnitude of the AC current applied to the second coil and a magnitude of the DC current applied to the first coil.

* * * * *